Figure 5:
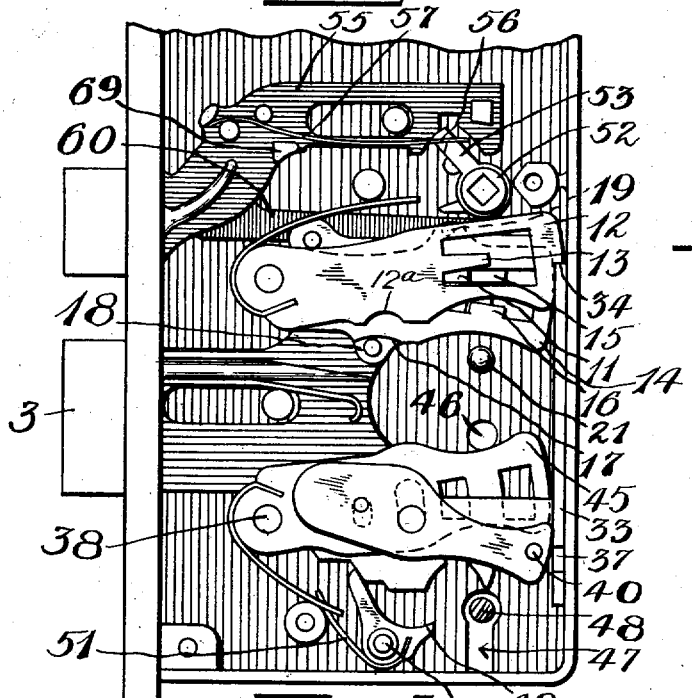

H. G. VOIGHT & N. B. HURD.
LOCK.
APPLICATION FILED APR. 11, 1913.
Reissued July 22, 1913.
13,601.
4 SHEETS—SHEET 1.
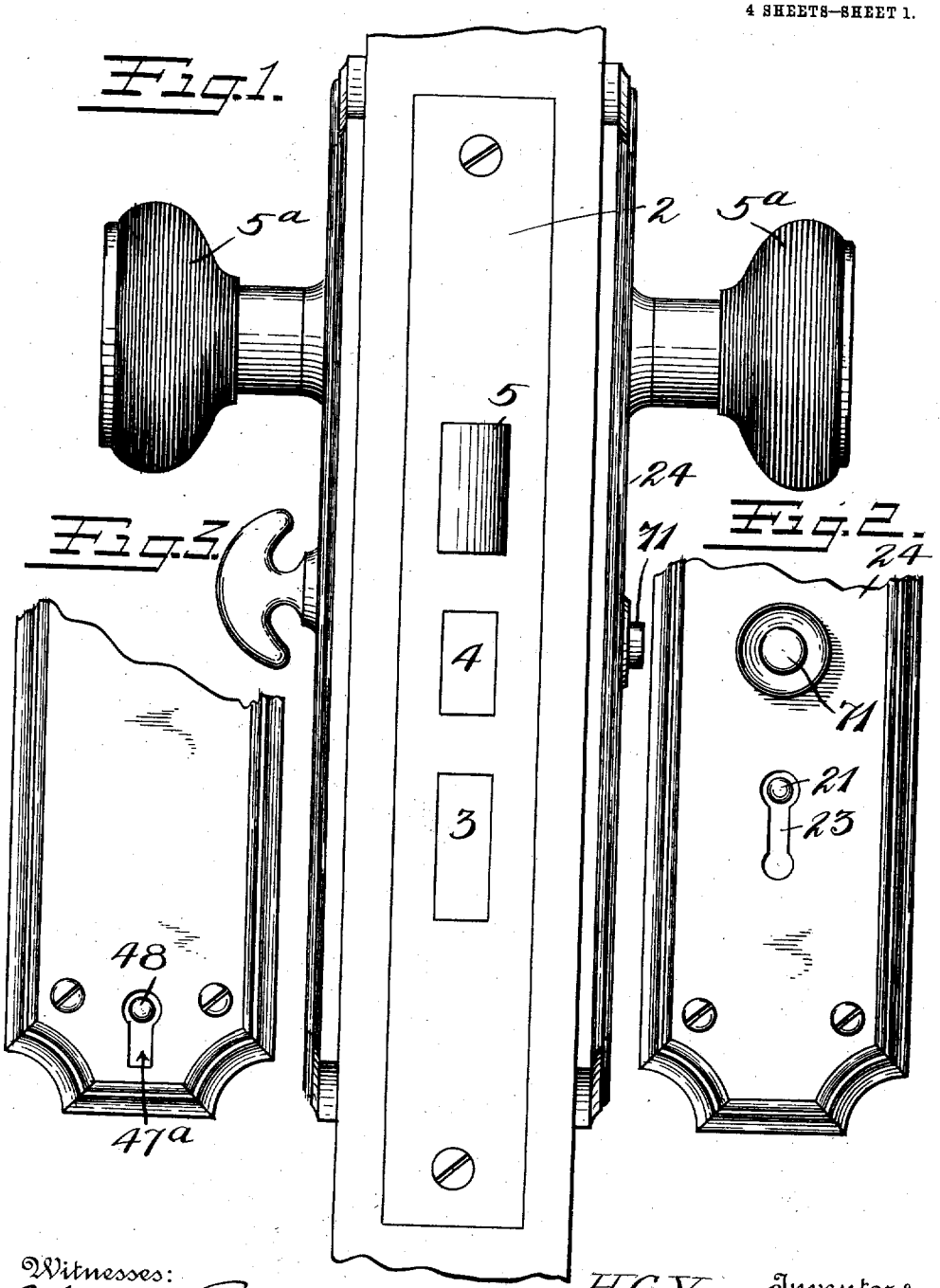
Witnesses:
Chas. A. Pearce
Ida M. Hunziker
H. G. Voight Inventors
By their Attorneys N. B. Hurd
Dantel Dennee & Mitchell H. G. VOIGHT & N. B. HURD.
LOCK.
APPLICATION FILED APR. 11, 1913.
Reissued July 22, 1913.
13,601.
4 SHEETS—SHEET 2.
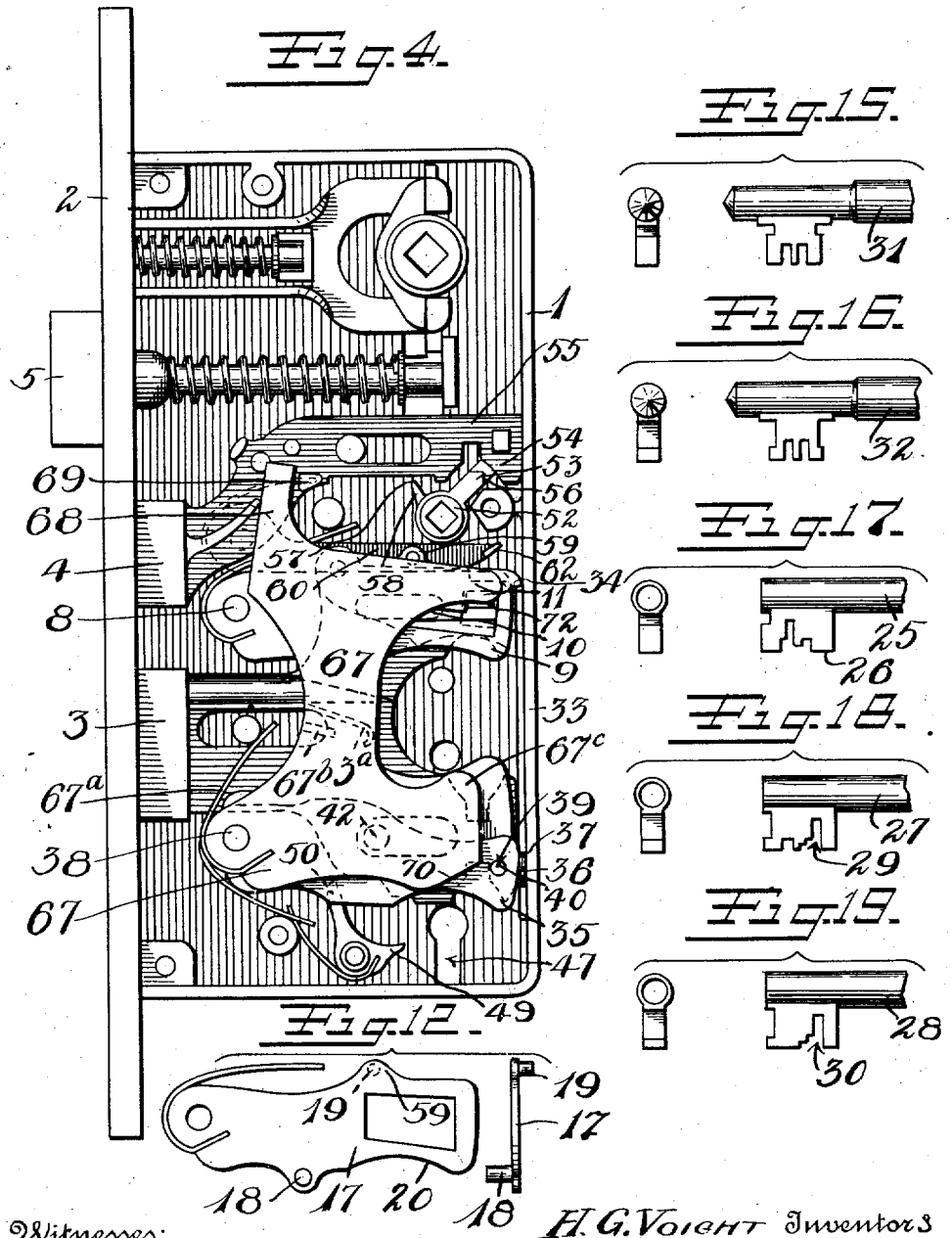
Witnesses:
Chas. A. Pearce
Ida M. Kingsker
H. G. Voight Inventors
N. B. Hurd
By their Attorneys
Brown & Mac Leod
COLUMBIA PLANOGRAPH CO., WASHINGTON, D. C.

H. G. VOIGHT & N. B. HURD.

LOCK.

APPLICATION FILED APR. 11, 1913.

Reissued July 22, 1913. 13,601.

4 SHEETS—SHEET 3.

Witnesses:
Chas. A. Pearce
Ida M. Kunzler

H. G. Voight
N. B. Hurd,
Inventors
By their Attorneys
Bailey, Barnes & Mulder

H. G. VOIGHT & N. B. HURD.

LOCK.

APPLICATION FILED APR. 11, 1913.

Reissued July 22, 1913. 13,601.

4 SHEETS—SHEET 4.

Witnesses:
Chas. A. Pearce
Ida McKinzie

H. G. Voight Inventors
N. B. Hurd
By their Attorneys
Dantel Bronner Muldrew

UNITED STATES PATENT OFFICE.

HENRY G. VOIGHT AND NORMAN B. HURD, OF NEW BRITAIN, CONNECTICUT, ASSIGNORS, BY MESNE ASSIGNMENTS, TO THE AMERICAN HARDWARE CORPORATION, OF NEW BRITAIN, CONNECTICUT.

LOCK.

13,601. Specification of Reissued Letters Patent. Reissued July 22, 1913.

Original No. 1,009,202, dated November 21, 1911, Serial No. 626,652. Application for reissue filed April 11, 1913. Serial No. 760,551.

*To all whom it may concern:*

Be it known that we, HENRY G. VOIGHT and NORMAN B. HURD, citizens of the United States, residing at New Britain, county of Hartford, State of Connecticut, have invented certain new and useful Improvements in Locks, of which the following is a full, clear, and exact description.

Our invention relates to locks, and is particularly concerned with locks adapted especially for the corridor doors of hotel rooms.

The object of the invention is to provide a lock of this character with means whereby when the door is locked from the inside by the thumb-turn bolt, it can be unlocked from the outside only by a special key, which may be kept at the office, namely, an emergency key usually in the hands of the proprietor of the hotel.

A further object is to provide means whereby when the door is locked on the inside by one of the duplicate change keys, it may be unlocked from the outside by the companion change key, so that when more than one person occupies a room the companion may lock the door on the inside against intrusion by strangers but leave the room accessible to his companion. On the other hand, when the door is locked on the inside by the thumb-turn bolt, it cannot be unlocked from the outside by the duplicate change key. Hence, in case the occupant of a room carries away one of the change keys on leaving the hotel, the room may be made inaccessible to the holder of said key by a later occupant.

The lock is so constructed and the guard key is so bitted that it will unlock the door from the outside when locked from the inside by one of the change keys, but it cannot unlock the door from the outside when the same is locked by the thumb-turn bolt from the inside. The construction is such, however, that when the lock has been locked from the outside by the guard key, it cannot be unlocked from the outside by any except the guard or emergency key, and finally, the lock is so constructed and the emergency key is so bitted that the latter may unlock the door from the outside, even though locked from the inside both by the thumb-turn bolt and the main locking bolt. Also, as in the case of the guard key, the emergency key will unlock the main bolt from the outside when locked from the inside by the change key. Other keys of the series employed with this lock consist of the maid's or master key, adapted to operate all locks upon a floor, and the housekeeper's or grand-master key, adapted to operate all locks on all floors when in normal condition.

A further feature of this lock is that it is provided with means whereby a drill pin key may operate upon either side of the lock, and a further feature consists in the fact that while the change, guard and emergency keys are of the drill pin type, the master or maid's and grand-master or housekeeper's key, are of the solid pin type. The outer key-hole, furthermore, is of the duplex type, whereby the drill pin keys may be operated in the normal manner with the pin uppermost, whereas the solid pin keys are operated in reverse position. The inside key-hole is adapted to take only the drill pin keys mentioned.

For the several objects mentioned, the invention consists in a construction and arrangement of parts, a preferred embodiment of which is illustrated in the accompanying drawings, in which—

Figure 9:
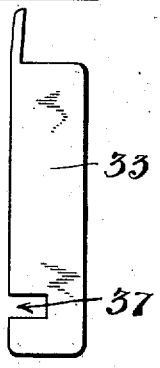
Figure 8:
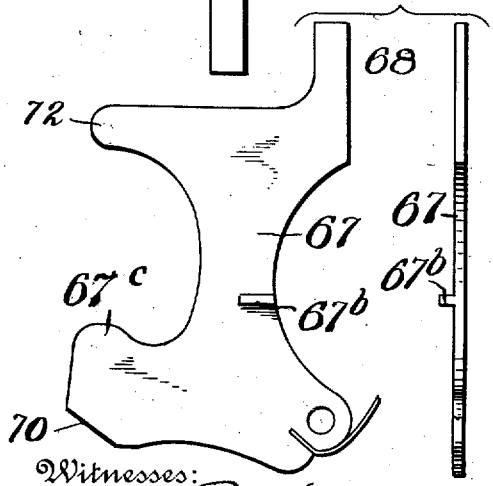
Figure 10:
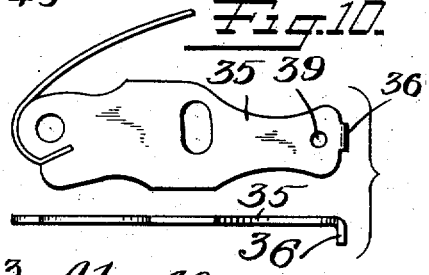
Figure 11:
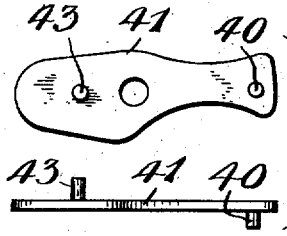
Figure 6:
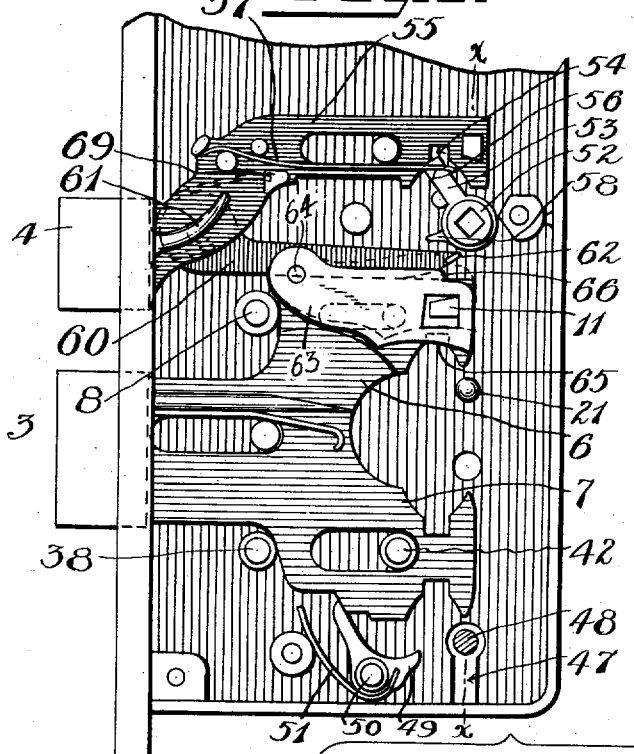
Figure 7:
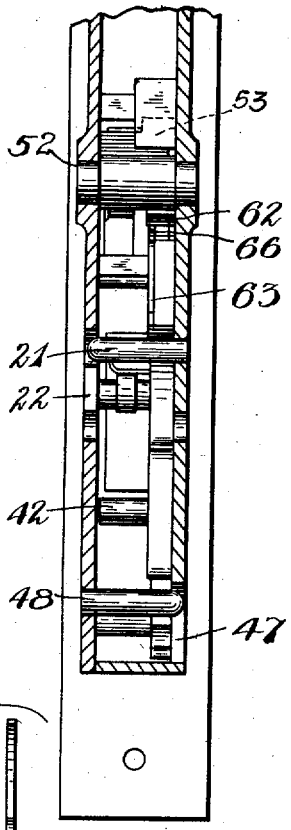
Figure 13:
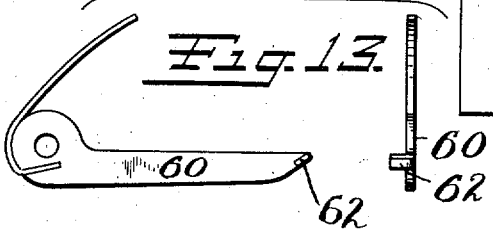
Figure 14:
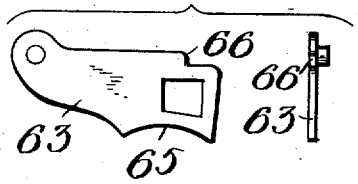

Figure 1 is a fragmentary view of the edge of a door showing our improved lock applied thereto. Fig. 2 is a fragmentary view of the outside escutcheon plate. Fig. 3 is a similar view of the inside escutcheon plate. Fig. 4 is a side elevation of the lock, the cover plate being removed to show the interior mechanism, and showing the bolts retracted. Fig. 5 is a fragmentary view similar to Fig. 4, showing the bolt projected, certain parts being removed for clear illustration. Fig. 6 is a view similar to Fig. 5, with the bolt tumblers removed for clear illustration. Fig. 7 is a sectional view on the line $x$—$x$ Fig. 6. Fig. 8 comprises a side and edge view of a blocking and indicator member. Fig. 9 is a side view of a tumbler bar. Fig. 10 comprises a side and edge view of a tumbler release lever. Fig. 11 comprises a like view of a reverse acting tumbler release member. Fig. 12 comprises a side and edge view of a tumbler operating lever for the upper tumblers of the main bolt. Fig. 13 comprises a side and edge view of a bolt connecting member. Fig. 14 is a like view of a companion bolt connecting member. Figs. 15 to 19 inclusive, each comprise end and side elevations of the bits and portions of the shanks of the master, grand-master, change, guard and emergency keys respectively.

In the embodiment of our invention herein selected for illustration, 1 indicates a lock case, 2 the face plate, 3 the main bolt, 4 a thumb-turn bolt, and 5 a latch bolt operable by the door knobs 5[a]. The main bolt 3, as illustrated in Fig. 6, is provided with an upper extension 6 and a lower extension 7, each of which is provided with a set of tumblers. The tumblers of the upper extension are pivoted for the most part upon a stud 8 of the lock case. Of this set the uppermost tumbler 9 is provided with the usual gate 10, which coöperates with the racking stump 11 carried by the upper bolt extension. Next below the tumbler 9 is what may be termed an emergency or guard tumbler 12, clearly shown in Fig. 5, which is provided with a guard tongue 13 to coöperate with the racking stump 11 under the influence of the guard and emergency keys, as hereinafter described. Beneath the tumbler 12 is a tumbler 14, having gates 15 and 16 which coöperate with the racking stump 11. Additional tumblers similar to 14 may be provided to increase the number of permutations necessary to determine the bitting of the usual keys intended to operate the bolt. Below the tumblers mentioned is located a tumbler operating lever 17 shown in Fig. 12, and partially in Fig. 5. This tumbler has a pin 18 which extends laterally or toward the observer, as viewed in Fig. 5, and a second pin 19 which extends rearwardly, as viewed in said figure for a purpose to be described. The sweep 20 of this tumbler lever is so arranged and certain of the keys are so bitted that this lever will be raised, and by its pin 18 simultaneously raise the tumblers above it, with the exception of the emergency tumbler 12, this because the latter tumbler is provided opposite the pin 18 with a cut away portion 12[a]. Just below the upper set of tumblers is a key post 21 accessible from the outer side through a key-hole 22, Fig. 7, in the cap or cover plate of the lock, which key-hole is duplex, as indicated by the key-hole 23, Fig. 2, of the escutcheon plate 24, which registers therewith.

The change keys, as well as the guard and emergency keys, are of the drill pin type to fit this key pin 21, and these keys operate from the outside directly upon the upper set of tumblers. The change key 25 (Fig. 17) is so bitted at 26 that in projecting the bolt it raises the emergency tumbler 12 sufficiently to permit the fence 11 of the bolt to pass beneath its tongue 13, whereby this tumbler is left in such position that the bolt may be retracted by any of the other keys of the series. The guard key 27 and the emergency key 28, however, each have depressions 29 and 30 respectively, whereby when the bolt is projected by either of these keys the emergency tumbler is not raised, so that the fence passes over the emergency tongue 13, whereby the bolt is blocked against retraction by any of the other keys except the guard and emergency keys. Hence, by locking with the guard or emergency keys, the main bolt is blocked against retraction by any except the same keys. The outer key-hole, as before mentioned, is of the duplex type, to receive the master and grand-master keys 31 and 32, Figs. 15 and 16 respectively, which, as shown, are of the solid pin type. These keys are inserted in the key-hole in reversed position, or with the bits extending upward. These keys, furthermore, do not operate directly upon the upper set of tumblers, but upon the lower set, which are connected by a tumbler bar 33 at the back of the lock case with the upper set of tumblers. The main tumblers of the upper set, including the emergency tumbler, are shouldered, as for example at 34, as shown in Figs. 4 and 5, to engage the upper end of the tumbler bar 33.

The outermost tumbler 35 of the lower set is provided with a laterally projecting finger 36, Fig. 10, which engages a notch 37 near the lower end of the tumbler bar. This tumbler 35 is pivoted upon the post 38 on the lock case and has an opening 39, which engages a pin 40 of a reversing lever or tumbler 41, Figs. 4, 5 and 11. This reversing lever is pivoted on the pin 42 (Fig. 5) and has an oppositely projecting pin 43 engaging slots, such for example as 44, in the several tumblers, such as 45 (Fig. 5) beneath it, within which slots the pin 43 has a certain amount of lost motion, but said lower tumblers engage said pin 43 when one of the solid pin keys, such as the master or grand-master keys, is inserted in the outside key-hole with its pin seated, for example, in the opening 46 (Fig. 5) in back of the lock case. The bits of these keys in projecting or retracting the main bolt 3, depress these tumblers 45, and thus, through the pin 43 of the lever 41, tilt the latter so that the pin 40 at its opposite end in engagement with the lever 35, causes said lever to operate the upper tumblers and release their gates from the fence 11. It is to be noted incidentally that when the upper tumblers are actuated by the tumbler bar 33, the emergency tumbler 12 is always raised so that the fence 11 of the bolt passes beneath the emergency tongue 13 of said tumbler, hence when the bolt is projected by the master and grand-master keys from the outside, it may always be retracted by these keys, as well as by the other keys of the series.

The back or inner side of the lock case is provided with a second key-hole 47, Figs. 5 and 6, and the cover plate is provided with a key post or pin 48, Figs. 5, 6 and 7, registering with this keyhole. This key-hole is not of the duplex type, and hence only the drill pin keys, such as the guest, guard and emergency keys, can be used upon the inner side of the door. When so used, these keys elevate directly the tumbler lever 35, and thence through the tumbler bar 33 raise the upper tumblers to release their gates from the fence 11. Hence the main bolt may be projected and retracted from the inner side by and only by the guest, guard and emergency keys. Adjacent the inner key-hole 47 is a blocking dog 49 pivoted to a post 50, and held by a spring 51 in position to prevent complete rotation of a key inserted from the inner side in projecting the main bolt. By this construction it is impossible to withdraw the key until the bolt is retracted. The spring mounting of the dog 49, however, permits of free rotation of the key to retract the bolt from the inside upon insertion of the key after the bolt has been projected.

In addition to the main bolt 3 and its mechanism, as above described, the lock is provided with a thumb-turn bolt 4 operated by a thumb-turn roll-back 52 having an arm 53 engaging a notch 54 in the tail 55 of the bolt 4. The roll-back arm is provided with shoulders, such as 56, adapted to be engaged by a spring 57 to hold the arm, and consequently the bolt, forward, safely in projected or retracted position. The roll-back hub 52 is provided with a second arm 58, which, when the bolt 4 is projected, lies in the position indicated in Fig. 6, wherein it may be engaged by a shoulder 59 of the tumbler lever 17, Fig. 12, whereby when said lever is raised by a suitable key from the outside, the roll-back arm 53 will be released from dead locking position on the tail of the bolt 4. The bolt 4 carries also a coupling rod 60 pivoted at 61 thereon and having at its rear end a lug 62, which rod overlies a short latch member 63 mounted at 64 on the upper extension 6 of the main bolt 3. This latch member has a sweep 65 adapted to be engaged by the bits of the emergency key to raise said latch member and bring its shoulder 66 in front of the lug 62 on the coupling rod 60. Simultaneously the emergency key raises the tumbler lever 17, causing its upper projection 59 to release the roll-back as before described, whereby said emergency key may from the outside retract the thumb-turn bolt 4 simultaneously with the main bolt 3, through the engagement of the shoulder 66 of the member 63 with the lug 62 on the connecting link 60. The pin 19 on tumbler 17 returns the latch member 63 to normal lower position out of range of the coupling rod when the bolts are retracted. The change key and the guard key, which are the only other keys capable of directly operating upon the upper tumblers, are so bitted that they do not raise the latch member 63; consequently these keys are not capable of retracting the thumb-turn bolt simultaneously with the main bolt from the outside.

In order to prevent the unlocking of the door from the outside by the master and grand-master keys when locked on the inside by the thumb-turn bolt 4, we provide means for blocking the outer key-hole 22 against insertion of these keys. To this end we provide a blocking member 67 shown in normal position in Fig. 4, and in detail in Fig. 8. This member is provided at the top with an upwardly extended finger 68 engaged by a lug 69 on the tail of the bolt 4, whereby said blocking member is tilted forward when the thumb-turn bolt is projected. At the lower end of the blocking member is an extension or finger 67[c], which, when the member is so tilted forward, lies opposite and blocks the lower portion of the outer duplex key-hole 22, thus preventing the insertion of the solid pin master and grand-master keys, while still permitting insertion of the change, guard and emergency keys. It is to be borne in mind, however, that, although the change and guard keys may be fully inserted in the lock from the outside when the thumb-turn bolt is thrown, said keys cannot retract said thumb-turn bolt, for the reason that they are incapable of operating the lever 17 to release the thumb-turn roll-back from dead-locking position, and are also incapable of raising the connecting member 63 to cause its shoulder 66 to engage the coupling rod 60. Hence these keys cannot open the door from the outside when the thumb-turn bolt is thrown. The keys, however, can open the door from the outside when locked on the inside only by one of the duplicate change keys, since this duplicate change key operating from the inside operates the upper set of tumblers through the tumbler bar 33 in a manner to cause the fence 11 on the main bolt to pass below the emergency tumbler. Furthermore, when the main bolt is thrown from the inside by one of the change keys, and in fact also by the guard or emergency key, which three keys are the only keys that can operate from the inside, the door cannot be unlocked from the outside by either the master or grand-master keys, for the reason that the blocking lever member 67 is engaged at its lower edge 70 by the bits of these keys and raised so that its finger 69 blocks the outside key-hole against insertion of the master and grand-master keys. If, when so raised by projection of the main bolt by a key from the inside, the thumb bolt is not also projected so that its lug 69, which engages the finger 68 of the blocking member, is not in forward position to hold this member in indicating position against the influence of its spring 67[a], the blocking member is held in this forward position, nevertheless, by a spring hook member $3^a$ carried by the main bolt 3, which engages behind a lug $67^b$ on the rear side of the blocking member. The hook $3^a$ being resilient, permits the lug $67^b$ to spring past it to be held thereby when the main bolt has been projected, the thumb-turn bolt being in retracted position and the thumb-turn bolt being then projected, which operation moves the blocking member forward. Finally, it is often desirable that the lock be provided with means on the outside to indicate to the holders of the master and grand-master keys, namely, the maid and housekeeper, that the door is locked from the inside without the necessity of inserting these keys in the lock. To this end, the outer escutcheon plate 24, Figs. 1 and 2, is provided with an indicating member in the form of a button 71 having a stem which projects into the lock, which stem is normally spring-projected. The blocking member 67 also forms an indicating member controller, and to this end has a finger 72, which is moved into the path of this indicator stem when this indicating member controller is tilted forward either by the projection of the thumb-turn bolt 4 or by one of the keys above mentioned operating from the inside.

In its preferred form the indicating button 71, forming the indicating member, is normally projected outwardly beyond the outer face of the lock by its spring. The indicating member controller 67, when both the main bolt and the thumb bolt are retracted from the inside, is out of the path of movement of the button 71, so that the maid will know by the fact that the button can be pressed inwardly, that access may be had to the room, and that neither bolt has been projected from the inside of the lock. If, however, the occupant of the room has projected the main bolt or the thumb bolt, the finger 72 of the indicating member controller 67 will be positioned in rear of the stem of the button 71, and will block inward movement thereof, so that if this button can not be pushed inwardly, the maid will know that the guest is still in the room and has projected one of the bolts from the inside. As long as either the main bolt or the thumb bolt is projected, the finger 72 will block inward movement of the button 71, but when both bolts are retracted, the button may be pushed inwardly, as the blocking finger 72 will be moved from the path of the button stem by retraction of said bolts.

While we have herein described the particular embodiment of our invention, it is to be understood that the same may be altered in detail and in relative arrangement of parts within the scope of the appended claims.

What we claim is:

1. In a lock, the combination with a bolt, of a series of keys including change, guard and emergency keys, means whereby said bolt may be projected and retracted from the outer side by all of said keys and may be projected and retracted from the inside by certain of said keys, and means to prevent the operation of said bolt from the inner side by certain other of said keys.

2. In a lock, the combination with a main bolt, of a series of keys including change, guard and emergency keys, certain of the keys of the series being of the drill pin type and others of the solid pin type, a key-hole and key-post at the outer side adapted to receive the drill pin keys, said key-hole being also constructed to receive the solid pin keys, a key-hole and key-post on the inner side adapted to receive the drill pin keys only whereby said main bolt may be projected and retracted from the outer side by all of said keys and projected and retracted from the inside only by the drill pin keys.

3. In a lock, the combination with a main bolt, of a series of keys, certain of said keys being of the drill pin type and certain others being of the solid pin type, a key-hole and key-post at the outside adapted to receive the drill pin keys, said key-hole being adapted also to receive the solid pin keys, a key-hole and key-post on the inner side adapted to receive only the drill pin keys whereby said main bolt may be operated from the outside by all of said keys and may be operated from the inside only by said drill pin keys.

4. In a lock, the combination with a main bolt, of a series of keys, including a key of the drill pin type, a key-hole and key-post on the outer side adapted to receive said key, a key-hole and key-post on the inner side also adapted to receive said key, and means coöperating with said bolt and said key to permit operation of the bolt from either side by said key.

5. In a lock, the combination with a main bolt, of a series of keys including drill pin keys and solid pin keys, a key-hole and key-post on the outer side adapted to receive the drill pin keys, said key-hole being adapted also to receive the solid pin keys, a key-hole and key-post on the inner side adapted to receive only the drill pin keys, a plurality of tumbler mechanisms coöperating with said bolt, certain of said tumbler mechanisms being operable from the outside by said drill pin keys, certain other of said tumbler mechanisms being operable from the outside by the solid pin keys, and both of said tumbler mechanisms being operable from the inside by said drill pin keys only.

6. In a lock, the combination with a main bolt, of a series of keys including change, guard and emergency keys, a guard tumbler coöperating with said bolt adapted to be raised by said change key in the projection of said bolt from the outside so that said bolt may be retracted by any of said keys from the outside, said guard tumbler and said guard and emergency keys being so constructed that said bolt may be projected by said guard and emergency keys without operating said guard tumbler whereby said bolt cannot be retracted by said change key from the outside, a second tumbler mechanism for said bolt connected with the first and operable from the inside by said change, guard and emergency keys, whereby said main bolt may be retracted from the inside by any of said three keys mentioned.

7. In a lock, the combination with a main bolt, of a series of keys including duplicate change keys, a guard and an emergency key, tumbler mechanism so constructed that said bolt may be retracted from the outside by either of said change keys when projected from the inner side by either the duplicate change, the guard or emergency keys, and means to prevent retraction of said bolt from the outside by either of the change keys when projected from the outside by said guard or emergency key.

8. In a lock, the combination with a main bolt, of a series of keys including duplicate change keys, a guard and an emergency key, a set of tumblers for said bolt including an emergency tumbler so constructed and arranged that when said bolt is projected from the outside by said change key, it may be retracted from the outside by any of the keys of the series and so constructed that when said bolt is projected from the outside by said guard or emergency key, it cannot be retracted from the outside by any except the guard or emergency key, a second set of tumblers for said bolt connected with the first set and operable from the inside by the change, guard and emergency keys and so constructed that the bolt may be retracted from the inside by either the change, guard or emergency key when projected from the outside by any of the keys.

9. In a lock the combination with a main bolt, of a series of keys including master, grand-master, change, guard and emergency keys, a set of tumblers for said bolt including an emergency tumbler adapted to be operated directly by said change, guard and emergency keys, said emergency tumbler being constructed to permit retraction of the bolt from the outside by all of the keys when projected by any except the guard and emergency keys, and means to prevent retraction of the bolt from the outside by the master or grand-master key when projected from the inside by the change, guard or emergency key.

10. In a lock, the combination with a main bolt, of a series of keys including master, grand-master, change, guard and emergency keys, a set of tumblers for said bolt including an emergency tumbler, said set being operable directly from the outside by said change, guard and emergency keys to project and retract the bolt, a second set of tumblers for said bolt operatively connected with the first set and arranged to be operated from the outside directly by the master and grand-master keys and thereby operate the first set through said connection in projecting and retracting the main bolt, said emergency tumbler being constructed and arranged to prevent retraction of the main bolt from the outside by any of the keys except the guard and emergency keys when projected from the outside by the guard or emergency key.

11. In a lock, the combination with a main bolt, of a series of keys including master, grand-master, change, guard and emergency keys, said change, guard and emergency keys being adapted exclusively to operate the bolt both from the outside and the inside, a blocking member operable by said change, guard or emergency key when operated from the inside to prevent retraction of the bolt from the outside by the master and grand-master keys.

12. In a lock, the combination with a main bolt, of a series of keys including master, grand-master, change, guard and emergency keys, tumbler mechanism for said bolt including an emergency tumbler constructed and arranged to prevent retraction of the bolt from the outside by the other keys when projected by the guard or emergency key from the outside, and a member operable from the inner side by the change, guard and emergency keys to block the insertion of the master and grand-master keys from the outside.

13. In a lock, the combination with a main bolt of a series of keys including master, grand-master, change, guard and emergency keys, said guard, change and emergency keys being of the drill pin type, a key-hole and key-post adapted to receive the change, guard or emergency keys from the outside, a set of tumblers operable by any of said three keys from the outside to project and retract the latch bolt, said key-hole being adapted to receive said master and grand-master keys from the outside, and means to enable said master and grand-master keys to operate said tumbler mechanism from the outside, a key-hole and key-post adapted to receive said change, guard and emergency keys only from the inside whereby key operation of said bolt from the inside is confined to said three keys, said tumblers including an emergency tumbler constructed and arranged to prevent operation of any of the other keys when the bolt is projected from the outside by said guard or emergency key but to permit retraction of said bolt from the inner side by either the change, guard or emergency key when the bolt has been projected from the outside by any of the keys.

14. In a lock, the combination with a main bolt, of a series of keys, a set of key-controlled tumblers adapted to be operated directly from the outside by certain of said keys to project and retract the bolt, a second set of tumblers for said bolt adapted to be operated directly from the outside by certain other of said keys, connecting means between said sets of tumblers whereby the operation of said second set operates the first set, said second set of tumblers being adapted to be operated from the inner side by certain of said keys and simultaneously to operate the first set whereby the operation of said bolt from the inside may be confined to certain of said keys.

15. In a lock, the combination with a main bolt, of a series of keys, a set of tumblers for said bolt operable directly from the outside by certain of said keys in projecting and retracting the latch bolt, a second set of tumblers for said bolt operable directly from the outside by certain other of said keys, connecting means between said sets of tumblers whereby said operation of the second set serves to operate the first set, and means whereby said second set of tumblers may be operated from the inside by certain of said keys exclusively and by said connection operate the first set whereby said bolt may be operated from the outside by all of said keys but operated from the inside only by certain of said keys.

16. In a lock, the combination with a main bolt, of a thumb bolt, and key-controlled means whereby said thumb bolt may be retracted simultaneously with said main bolt.

17. In a lock, the combination with a main bolt, of a thumb bolt, a series of keys including an emergency key, and key-controlled means whereby said thumb bolt may be retracted simultaneously with said main bolt exclusively by said emergency key.

18. In a lock, the combination with a main bolt, of a thumb bolt, a series of keys including a guard and an emergency key, and key-controlled means operable exclusively by said emergency key whereby said thumb bolt may be retracted simultaneously with said main bolt by said key, and means whereby retraction of the main bolt may be confined exclusively to the guard and emergency keys when projected by said keys.

19. In a lock, the combination with a main bolt, of a thumb bolt adapted to be projected from one side only of the lock, a series of keys including an emergency key, and key-controlled means whereby said thumb bolt may be retracted from the outside exclusively by said emergency key.

20. In a lock, the combination with a main bolt, of a thumb bolt adapted to be projected only from the inside, a series of keys including an emergency key, and key-controlled means whereby said thumb bolt may be retracted from the outside exclusively by the emergency key, and a thumb turn to retract said thumb bolt from the inside.

21. In a lock, the combination with a main bolt, of a thumb bolt projectable from the inside only by a thumb-turn, a series of keys including a guard key and an emergency key, and key-controlled means whereby said thumb bolt may be retracted from the outside exclusively by said emergency key, means whereby said thumb bolt may be retracted from the inside exclusively by said thumb turn, and means whereby the main bolt may be retracted from the inside exclusively by the guard and emergency keys.

22. In a lock, the combination with a main bolt, of a thumb bolt, a connecting member carried by said main bolt, a connecting member carried by said thumb bolt, a series of keys including an emergency key and key-controlled means whereby said connecting members may be connected exclusively by said emergency key whereby said thumb bolt and main bolt may be retracted simultaneously by said key.

23. In a lock, the combination with a main bolt, of a thumb bolt adapted to be projected exclusively by a thumb turn from the inside, a series of keys including a guard key and an emergency key, connecting members carried by said main bolt and thumb bolt respectively, means on said emergency key exclusively to connect said connecting members when said key is operated from the outside to simultaneously retract the main bolt and thumb bolt, said connecting means being unaffected by said guard key whereby said guard key can retract only the main bolt from the outside, and means whereby retraction of the main bolt from the inside may be confined to the guard and emergency keys.

24. In a lock, the combination with a main bolt, of a thumb bolt, means whereby said thumb bolt may be projected exclusively from the inside, a series of keys including a change, guard and emergency key, key-controlled means operable exclusively by said emergency key whereby said thumb bolt and main bolt may be retracted simultaneously, means whereby said main bolt may be retracted exclusively by said change, guard and emergency keys from the outside when the thumb bolt is projected, and means whereby said main bolt may be retracted from the inside exclusively by said change, guard and emergency keys.

25. In a lock, the combination with a main bolt, of a thumb bolt, key-controlled connecting members on said main bolt and thumb bolt respectively, means whereby said connection may be effected from the outside exclusively by said emergency key to retract the main and thumb bolts simultaneously from the outside, and means whereby said main bolt may be retracted from the inside exclusively by the change, guard and emergency keys.

26. In a lock, the combination with a main bolt, of a thumb bolt, a series of keys including an emergency key, and key-controlled means whereby said main bolt may be connected with said thumb bolt and the bolts operated simultaneously exclusively by said emergency key.

27. In a lock, the combination with a main bolt, of a thumb bolt projected exclusively from the inside by a thumb turn, a series of keys including an emergency key, key-controlled means for connecting said bolts operable from the outside exculsively by said emergency key to operate the bolts simultaneously, means to permit retraction of the main bolt from the outside exclusively by the change, guard and emergency keys when the thumb bolt is projected, and means whereby said main bolt may be retracted from the inside exclusively by said change, guard and emergency keys.

28. In a lock, the combination with a main bolt, of a thumb bolt, a thumb turn dead-locking roll-back for said thumb bolt operable from the inside, a series of keys including an emergency key, key-controlled means for connecting said bolts and for releasing said dead-locking means operable exclusively by said emergency key, means to prevent operation of all the keys except the guard, change and emergency keys from the outside when the thumb bolt is projected, and means to confine operation of the main bolt from the inside to said guard, change and emergency keys.

29. In a lock, the combination with a main bolt, of a thumb bolt projectable from the inside exclusively by a thumb turn, a series of keys including master, grandmaster, change, guard and emergency keys, a combined blocking and indicator member operable by the change, guard and emergency keys, a visible indicator member coöperating therewith, said indicator member being arranged to block operation of the bolt from the outside by the master and grand-master keys when the thumb bolt is projected and to indicate the projection of the thumb bolt at the outside of the lock.

30. In a lock, the combination with a main bolt, of a thumb bolt projectable exclusively from the inside by a thumb turn, a series of keys including master, grand-master, change, guard and emergency keys, a combined blocking and indicator member operable by the change, guard and emergency keys, a visible indicating member co-operating therewith, said blocking and indicator member being adapted to prevent retraction of the main bolt from the outside when projected from the inside and to indicate said projection of the main bolt at the outside.

31. In a lock, the combination with a main bolt, of a thumb bolt projectable from the inside exclusively, a series of keys including master, grand-master, change, guard and emergency keys, a combined blocking and indicator member adapted to be moved to blocking and indicating position by projection of the thumb bolt or by projection of the main bolt from the inside to block retraction of the main bolt from the outside by the master and grand-master keys, and means whereby retraction of the main bolt from the inside may be confined to said change, guard and emergency keys.

32. In a lock, the combination with a main bolt, of a thumb bolt projectable from the inside exclusively, a series of differently bitted keys for operating said bolts including an emergency key, latching members on said main bolt and thumb bolt respectively, said emergency key exclusively being constructed to connect said main bolt latch with said thumb bolt latch whereby said main and thumb bolts may be retracted simultaneously by said key.

33. In a lock, the combination with a main bolt, of a thumb bolt, a combined thumb-turn roll-back and dead-locking member for said thumb bolt operable from the inside exclusively, latch members on said main bolt and thumb bolt respectively, and a series of differently bitted keys for operating said bolts including an emergency key, said emergency key having means to release said dead-locking member and to connect said latching members whereby said thumb bolt and said main bolt may be retracted simultaneously by said emergency key.

34. In a lock, the combination with a main bolt, of a thumb bolt projectable from the inside exclusively, an indicating member for the outer side of said lock, an indicating member controller adapted to be moved to one controlling position by the projection of said thumb bolt, and means for retaining said indicating member controller in such position when said thumb bolt is retracted and said main bolt remains projected.

35. In a lock, the combination with a main bolt, of a thumb bolt, an indicating member for the outer side of said lock an indicating member controller adapted to be moved to one controlling position by said thumb bolt, and means on said main bolt to maintain said indicating member controller in such position when said thumb bolt has been retracted and said main bolt remains projected.

36. In a lock, the combination with a main bolt, of a thumb bolt, a series of keys including change, guard and emergency keys, an indicating member for the outer side of said lock, an indicating member controller adapted to be moved to one controlling position by projection of said thumb bolt or by projection of said main bolt from the inside exclusively, and means to maintain said controller in such position when said thumb bolt is retracted and said main bolt remains projected.

37. In a lock, the combination with a main bolt, of a thumb bolt, a series of keys including change, guard and emergency keys, an indicating member for the outer side of said lock, an indicating member controller adapted to be moved to one controlling position by said thumb bolt, means to confine projection and retraction of the main bolt from the inside exclusively to said change, guard and emergency keys, means to maintain said indicating member controller in such controlling position when said thumb bolt is retracted and said main bolt remains projected after being projected from the inside.

38. In a lock, the combination with a main bolt of a thumb bolt, a series of differently bitted keys for operating said bolts including an emergency key and key controlled means whereby said thumb bolt may be retracted simultaneously with said main bolt only by some of said series of keys.

39. In a lock, the combination with a main bolt of a thumb bolt adapted to be projected from one side only of the lock, a series of differently bitted keys for operating said bolts including an emergency key and key controlled means whereby said thumb bolt may be retracted from the outside only by some of said series of keys.

40. In a lock, the combination with a main bolt of a thumb bolt, a series of differently bitted keys for operating said bolts including an emergency key and key controlled means whereby said main bolt may be connected with said thumb bolt and the bolts operated simultaneously by one of said series of keys.

41. In a lock, the combination with a main bolt and a thumb bolt projectable from the inner side of said lock, an indicating member for the outer side of said lock, a movable indicating member controller, means to move said controller to one operating position by the projection of either of said bolts from the inner side of said lock only, means to retain said controller in such position, so long as either of said bolts remains projected, said controller being moved to another operating position when both of said bolts are retracted.

42. In a lock, the combination with a main bolt and a thumb bolt projectable from the inner side of said lock, an indicating member for the outer side of said lock, means to control said indicator, said means having at least two different positions and being movable to one of said positions by the projection of either of said bolts from the inner side of the lock only, said means being retained in said position so long as either of said bolts remain projected, and said means being movable to the other position when both of said bolts are retracted.

43. In a lock, the combination with a main bolt and a thumb bolt projectable from the inner side of said lock, an indicating member for the outer side of the lock controlled by the position of said bolts whereby when either of said bolts has been projected from the inner side of the lock only, said projection will be indicated by said indicating member and whereby when both of said bolts stand in a retracted position, said indicating member will indicate said retracted position.

HENRY G. VOIGHT.
NORMAN B. HURD.

Witnesses:
GWENDOLINE A. JACKSON,
O. BERTINI.

Copies of this patent may be obtained for five cents each, by addressing the "Commissioner of Patents, Washington, D. C."